(12) United States Patent
Li et al.

(10) Patent No.: US 10,429,570 B2
(45) Date of Patent: Oct. 1, 2019

(54) LIGHT GUIDE PLATE, BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventors: Tianlong Li, Beijing (CN); Zhendong Zhou, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 203 days.

(21) Appl. No.: 15/137,148

(22) Filed: Apr. 25, 2016

(65) Prior Publication Data

US 2017/0075056 A1    Mar. 16, 2017

(30) Foreign Application Priority Data

Sep. 15, 2015  (CN) .......................... 2015 1 0587544

(51) Int. Cl.
F21V 8/00    (2006.01)
(52) U.S. Cl.
CPC ........... G02B 6/005 (2013.01); G02B 6/0088 (2013.01); *G02B 6/0021* (2013.01); *G02B 6/0055* (2013.01); *G02B 6/0063* (2013.01)
(58) Field of Classification Search
CPC .... G02B 6/002; G02B 6/0021; G02B 6/0023; G02B 6/0025; G02B 6/0026; G02B 6/003; G02B 6/0031; G02B 6/0045; G02B 6/0088; G02B 6/0096; G09F 9/3023; G09F 9/3026; F21V 2200/20
See application file for complete search history.

(56) References Cited

U.S. PATENT DOCUMENTS

| 6,266,123 B1* | 7/2001 | Maejima ............... G02F 1/1333 349/158 |
| 6,426,763 B1* | 7/2002 | Sagawa ................ G02B 6/0086 346/65 |
| 2003/0103174 A1 | 6/2003 | Han et al. |
| 2011/0063875 A1* | 3/2011 | Yang .................... G02B 6/0023 362/621 |
| 2011/0267841 A1* | 11/2011 | Lee ........................ G02B 6/003 362/613 |

(Continued)

FOREIGN PATENT DOCUMENTS

| CN | 1423157 A | 6/2003 |
| CN | 101226307 A | 7/2008 |

(Continued)

OTHER PUBLICATIONS

The First Chinese Office Action dated Oct. 27, 2017; Appln. 201510587544.7.

(Continued)

*Primary Examiner* — Zheng Song
(74) *Attorney, Agent, or Firm* — Ladas & Parry LLP

(57) ABSTRACT

A light guide plate, a backlight module and a display device are provided. A first bottom surface of the light guide plate is provided with a first recess, and the first recess is configured to dispose a first optical film unit. A side surface of the light guide plate is provided with a second recess, and the second recess is configured to dispose a second optical film unit. The backlight module can be applied in multi-screen and multi-surface display devices.

10 Claims, 4 Drawing Sheets

(56) References Cited

U.S. PATENT DOCUMENTS

| | | | | |
|---|---|---|---|---|
| 2012/0113674 | A1* | 5/2012 | He | G02B 6/0088 362/606 |
| 2014/0092625 | A1* | 4/2014 | Lin | G02B 6/005 362/606 |
| 2014/0111975 | A1* | 4/2014 | Wu | G02B 6/0045 362/97.1 |
| 2014/0362328 | A1* | 12/2014 | Kuroki | G02F 1/133308 349/58 |
| 2015/0285990 | A1* | 10/2015 | Park | F21V 13/02 362/268 |
| 2015/0296174 | A1* | 10/2015 | Facchinetti | G09F 27/005 348/143 |
| 2015/0309244 | A1* | 10/2015 | Kim | G02B 6/0076 362/616 |
| 2016/0187571 | A1* | 6/2016 | Shao | G02B 6/0088 349/65 |

FOREIGN PATENT DOCUMENTS

| | | |
|---|---|---|
| CN | 201765536 U | 3/2011 |
| CN | 202204951 U | 4/2012 |
| CN | 202256962 U | 5/2012 |
| CN | 103197370 A | 7/2013 |
| CN | 103900034 A | 7/2014 |
| CN | 103930809 A | 7/2014 |
| CN | 104503136 A | 4/2015 |
| DE | 19701132 A1 | 7/1998 |
| EP | 2748657 B1 | 7/2014 |

OTHER PUBLICATIONS

The Second Chinese Office Action dated Apr. 10, 2018; Appln. No. 201510587544.7.

* cited by examiner

LIGHT GUIDE PLATE, BACKLIGHT MODULE AND DISPLAY DEVICE

FIELD

Embodiments of the present disclosure relate to a light guide plate, a backlight module and a display device.

BACKGROUND

Most of backlight modules are constituted by a light source, a light guide plate, a reflector sheet and an optical film unit which are assembled together through a fixed frame.

However, with the development of the display technology, it is possible to develop multi-screen and multi-surface display (e.g., a main interface of a mobile phone and a side edge of the mobile phone are all used for display) to increase display area. It can be seen that, in case where a main screen and a side surface of the mobile phone are both required to perform display, the existing backlight modules can only provide backlight to the main screen and cannot satisfy demands of multi-screen and multi-surface display.

SUMMARY

Embodiments of the present disclosure provide a light guide plate, a backlight module and a display device which can be applied in multi-screen and multi-surface display devices.

At least one embodiment of the present disclosure provides a light guide plate, including: a first recess disposed on a first bottom surface of the guide light plate, the first recess being configured to dispose a first optical film unit; a second recess disposed on a side surface of the light guide plate, and the second recess being configured to dispose a second optical film unit.

In an example, the light guide plate further includes a third recess disposed on a second bottom surface of the light guide plate, the third recess being configured to dispose a third optical film unit, and the second bottom surface being a surface opposite to the first bottom surface.

In an example, the first optical film unit includes at least one of diffusion sheet, prismatic lens and protective film; the second optical film unit includes at least one of diffusion film, prismatic lens and protective film; and the third optical film unit includes at least one of diffusion film, prismatic lens and protective film.

At least one embodiment of the present disclosure provides a backlight module, including a light source, a first optical film unit, a second optical film unit and the light guide plate. The light guide plate includes: a first bottom surface and a second bottom surface disposed in opposite, and a side surface. The first bottom surface is provided with a first recess. The first optical film unit is disposed within the first recess. The side surface is provided with a second recess. The second optical film unit is disposed within the second recess.

In an example, the backlight module further includes a reflector sheet and a third optical film unit, the second bottom surface being provided with a third recess, the reflector sheet and the third optical film unit attached with the reflector sheet being disposed within the third recess.

In an example, the backlight module further includes a light shielding sheet. The light shielding sheet is disposed outside the first recess of the first bottom surface, and the first optical film unit is covered with a portion of the light shielding sheet.

In an example, the light shielding sheet is disposed outside the second recess of the side surface, and the second optical film unit is covered with a portion of the light shielding sheet.

In an example, the light shielding sheet is disposed outside the third recess of the second bottom surface, and the third optical film unit is covered with a portion of the light shielding sheet.

At least one embodiment of the present disclosure provides a display device, including the backlight module. The first bottom surface of the backlight module is provided with a first display panel, and the side surface of the backlight module is provided with a second display panel.

In an example, the first display panel and the second display panel are two portions formed by a flexible display panel upon being bent.

In an example, the second bottom surface of the backlight module is provided with a third display panel.

In an example, at least one of the first display panel, the second display panel and the third display panel is a touch display panel.

In an example, the display device further includes a transparent protective layer covering the first display panel and the second display panel.

In an example, at least one of the first display panel and the second display panel is a touch display panel.

According to at least one embodiment of the present disclosure, it provides a light guide plate, including: a first recess disposed on a first bottom surface of the light guide plate, the first recess being configured to dispose a first optical film unit; and a second recess disposed on at least one side surface of the light guide plate, the second recess being configured to dispose a second optical film unit.

According to at least one embodiment of the present disclosure, it provides a backlight module, including: a light source, a first optical film unit, a second optical film unit and a light guide plate. The light guide plate includes a first bottom surface and a second bottom surface disposed in opposite, and a plurality of side surfaces. The first bottom surface is provided with a first recess, and the first optical film unit is disposed within the first recess. At least one side surface is provided with a second recess, and the second optical film unit is disposed within the second recess.

In an example, the first bottom surface of the backlight module included in the display device is provided with a first display panel, and the at least one side surface of the backlight module is provided with a second display panel.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

Technical solutions of the embodiment will be described in a clearly and fully understandable way in connection with the drawings related to the embodiments of the present disclosure. It is apparent that the described embodiments are just a part but not all of the embodiments of the present disclosure. Based on the described embodiments herein, those skilled in the art can obtain other embodiment(s), without any inventive work, which should be fall within the scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

In the description as below, details such as certain system structure, interface and technology are provided for purpose of explanation instead of limitation so as to enable thorough understanding of the embodiments of the present disclosure. However, those skilled in the art shall understand that embodiments of the present disclosure are also implementable in other embodiments without such details. In some other circumstances, detailed description of well-known devices, circuits and methods will be omitted to avoid unnecessary details from hindering the explanation of the embodiments of the present disclosure.

Figure 1:
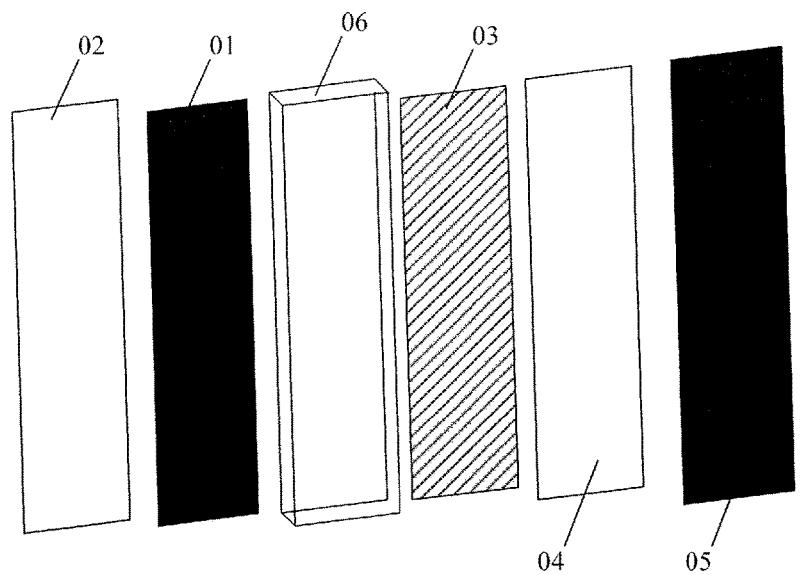
FIG. 1 is a schematically structural diagram illustrating a backlight module.

For example, as shown in FIG. 1, a backlight module is constituted by a light source (e.g., a LED light bar, not shown), a light guide plate 01, a reflector sheet 02 and an optical film unit (e.g., including a diffusion sheet 03, a prismatic lens 04 and a protective film 05, etc.) which are assembled together through a fixed frame 06.

Figure 2:
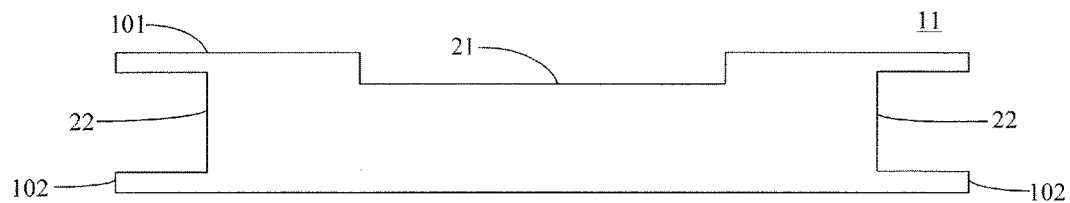
FIG. 2 is a schematically structural diagram illustrating a light guide plate as provided by an embodiment of the present disclosure.

Embodiments of the present disclosure provide a light guide plate 11, as shown in FIG. 2, a first bottom surface 101 of the light guide plate 11 is provided with a first recess 21, and the first recess 21 is configured to dispose a first optical film unit. A side surface 102 of the light guide plate 11 is provided with a second recess 22, and the second recess 22 is configured to dispose a second optical film unit.

It can be seen that the first recess 21 of the light guide plate 11 can be configured to dispose a first optical film unit, and the light guide plate 11 and the first optical film unit are cooperated with each other to provide a first display panel on the first bottom surface 101 with a back light. Similarly, the second recess 22 of the light guide plate 11 can be configured to dispose a second optical film unit, and the light guide plate 11 and the second optical film unit are cooperated with each other to provide a second display panel on the side surface 102 with a back light. In this way, multi-surface display of the first display panel and the second display panel through the light guide plate 11 can be achieved, which increases the display area of the display device.

The first optical film unit can include at least one of diffusion sheet, prismatic lens (e.g., upper prismatic lens and lower prismatic lens) and protective film.

Similarly, the second optical film unit can also include at least one of diffusion sheet, prismatic lens (e.g., upper prismatic lens and lower prismatic lens) and protective film.

Figure 3:
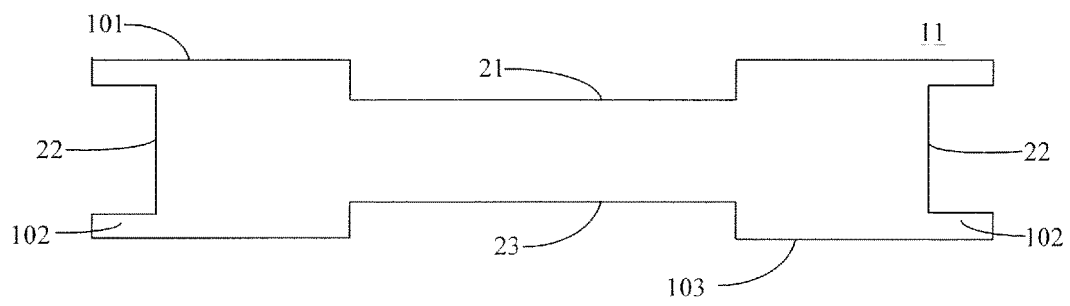
FIG. 3 is another schematically structural diagram illustrating a light guide plate as provided by an embodiment of the present disclosure.

For example, as illustrated in FIG. 3, the light guide plate 11 as provided by an embodiment of the present disclosure can also be configured to support a function of secondary screen display (e.g., secondary screen display of a clamshell or flip phone); in this case, a second bottom surface 103 of the light guide plate 11 is provided with a third recess 23, and the third recess 23 is configured to dispose a third optical film unit. The second bottom surface 103 is a surface opposite to the first bottom surface 101.

In this way, the light guide plate 11 and the third optical film unit within the third recess 23 are cooperated with each other to provide a third display panel on the second bottom surface 103 with a back light so as to achieve the function of secondary screen display of the third display panel.

Similarly, the third optical film unit can include at least one of diffusion sheet, prismatic lens (e.g., upper prismatic lens and lower prismatic lens) and protective film.

One ordinary skill in the art can select appropriate optical films to build up the above-mentioned first optical film unit, second optical film unit or third optical film unit according to practical experiences or requirements of frame effect. For example, a diffusion sheet, an upper prismatic lens and a lower prismatic lens can be used as the first optical film unit; or, two diffusion sheets, one prismatic lens and one protective film can be used as the first optical film unit; however, the embodiments of the present disclosure are not limited thereto.

Figure 4:
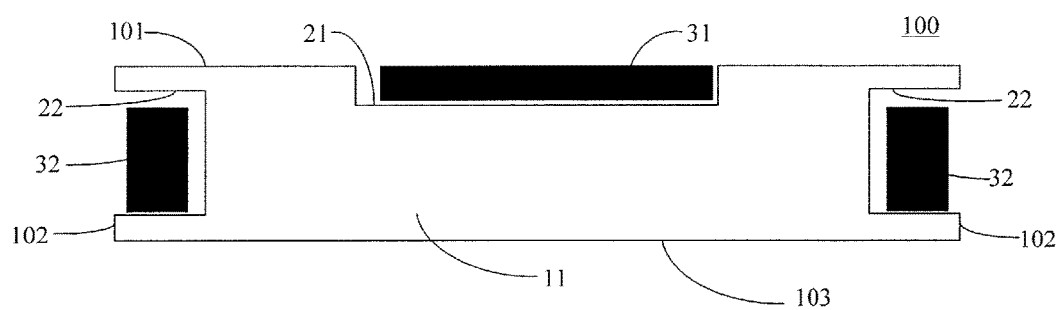
FIG. 4 is a schematically structural diagram illustrating a backlight module as provided by an embodiment of the present disclosure.

For example, embodiments of the present disclosure further provide a backlight module 100, as shown in FIG. 4. The backlight module 100 includes a light source (not shown), a first optical film unit 31, a second optical film unit 32 and a light guide plate 11. The light source can be disposed at a side of the light guide plate 11 or the backlight module 100 without the optical film units. It is contemplated that one or more light sources can be provided for the light guide plate or the backlight module.

It should be explained that the backlight module 100 can be a direct type backlight module or a side type backlight module; however, embodiments of the present disclosure are not limited thereto.

A first bottom surface 101 of the light guide plate 11 is provided with a first recess 21, and the first optical film unit 31 is disposed within the first recess 21. A side surface 102 of the light guide plate 11 is provided with a second recess 22, and the second optical film unit 32 is disposed within the second recess 22.

Figure 5:
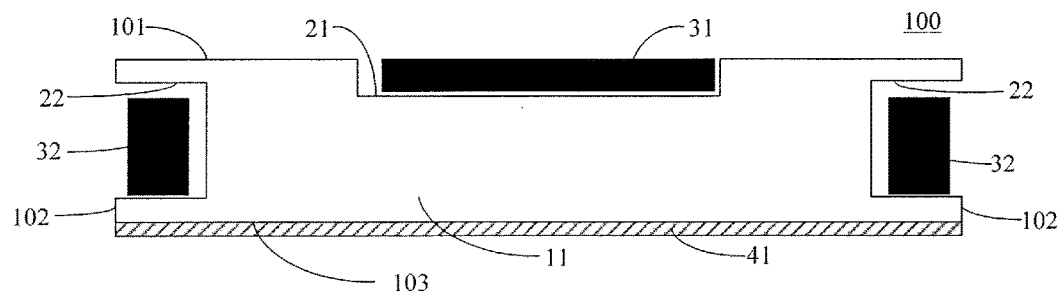
FIG. 5 is another schematically structural diagram illustrating a backlight module as provided by an embodiment of the present disclosure.

For example, as illustrated in FIG. 5, a second bottom surface 103 of the light guide plate 11 can be further provided with a reflector sheet 41. The second bottom surface 103 is a surface opposite to the first bottom surface 101.

For example, if the first bottom surface 101 of the light guide plate 11 corresponds to a main screen of a main interface of a mobile phone and the side surface 102 of the light guide plate 11 corresponds to a side screen at a side surface of the mobile phone, since the main screen usually has higher requirements on display effect than that of the side screen, a reflector sheet 41 can be disposed on the second bottom surface 103 so as to improve light guiding performance of the first bottom surface 101 of the light guide plate 11 by reflecting action, to increase the backlight brightness of the main screen.

The side screen at the side surface of the mobile phone can be provided with a virtual button instead of existing physical button so as to achieve functions, such as volume control, mute setting and screen locking of the mobile phone. The side screen can also serve as a message informing board to individually display the message in a scrolling manner, so as to avoid of frequently activating the main screen which may result in large power consumption, and prolong the battery life of the mobile phone.

In addition, the light guide plate 11 can be provided with a plurality of side surfaces 102, the second recess 22 can be disposed on one or more side surfaces 102 so as to achieve single-side display or multi-side display.

Figure 6:
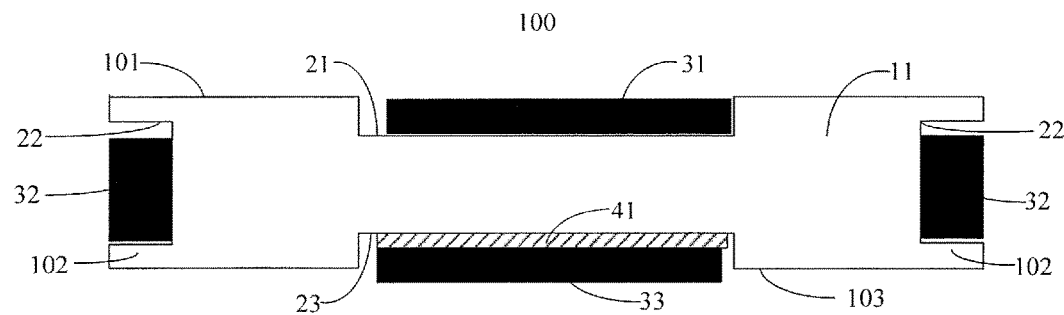
FIG. 6 is yet another schematically structural diagram illustrating a backlight module as provided by an embodiment of the present disclosure.

Alternatively, to support a function of secondary screen display of the display device (e.g., a function of secondary screen display of a clamshell phone), as illustrated in FIG. 6, the backlight module 100 can further include a reflector sheet 41 and a third optical film unit 33. The second bottom surface 103 is provided with a third recess 23, the reflector sheet 41 and the third optical film unit 33 attached with the reflector sheet 41 are disposed within the third recess 23. In this way, the light guide plate 11 and the third optical film unit 33 are cooperated with each other to provide a third display panel on the second bottom surface 103 with a back light, to achieve the function of secondary screen display of the third display panel. The light source can be disposed at one or two sides of the backlight module without the optical film units.

To improve the frame effect of the third display panel on the second bottom surface 103, an additionally light guide plate can be provided between the reflector sheet 41 and the third optical film unit 33. In this way, the reflector sheet 41, the additional light guide plate and the third optical film unit 33 are cooperated with each other to provide the third display panel with a back light. The reflector sheet 41 can improve the light guiding performance of the additional light guide plate by reflecting action, the backlight brightness of the third display panel can be increased.

Figure 7:
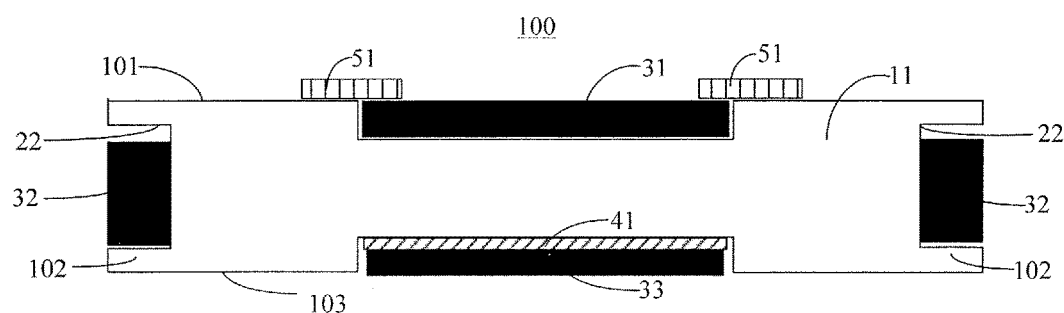
FIG. 7 is still another schematically structural diagram illustrating a backlight module as provided by an embodiment of the present disclosure.

As illustrated in FIG. 7, the backlight module 100 can further include a light shielding sheet 51. For example, the light shielding sheet 51 can be disposed outside the first recess 21 of the first bottom surface 101, and the first optical film unit 31 is covered with a portion of the light shielding sheet 51.

The light shielding sheet 51 can also be disposed outside the second recess 22 of the side surface 102, and the second optical film unit 32 is covered with a portion of the light shielding sheet 51. Alternatively, the light shielding sheet 51 can also be disposed outside the third recess 23 of the second bottom surface 103, and the third optical film unit 33 is covered with a portion of the light shielding sheet 51.

The light shielding sheet 51 can allow light from the light source to irradiate uniformly after transmitting through the light shielding sheet 51 so as to reduce optical loss of the backlight module 100.

The backlight module 100 as provided by embodiments of the present disclosure can also include other components, such as frame, and one ordinary skill in the art can make arrangement flexibly according to practical experiences without limiting embodiments of the present disclosure thereto.

Figure 8:
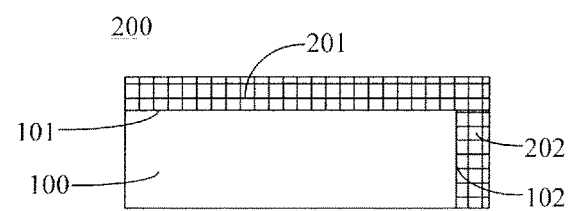
FIG. 8 is a schematically structural diagram illustrating a display device as provided by an embodiment of the present disclosure.

Embodiments of the present disclosure further provide a display device 200, as illustrated in FIG. 8, the display device 200 includes any one of the backlight modules 100. The first bottom surface 101 of the backlight module 100 is provided with a first display panel 201, and the side surface 102 of the backlight module 100 is provided with a second display panel 202.

The first display panel 201 and the second display panel 202 can be digital paper, liquid crystal display panel and the like; however, embodiments of the present disclosure are not limited thereto.

Optionally, the first display panel 201 and the second display panel 202 can be two portions formed by a single flexible display panel upon being bent.

Alternatively, the first display panel 201 and the second display panel 202 are designed in sections and are disposed on a backlight module 100 by splicing technology. The first display panel 201 and the second display panel 202 can be interconnected through a black matrix.

Figure 9:
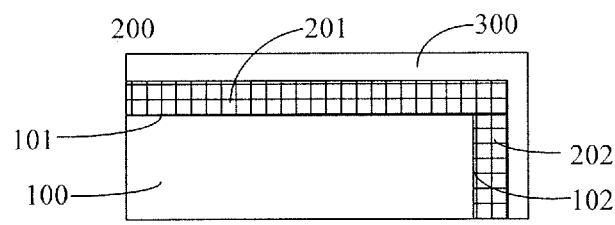
FIG. 9 is another schematically structural diagram illustrating a display device as provided by an embodiment of the present disclosure.

For example, as illustrated in FIG. 9, a transparent protective layer 300, such as high strength glass or organic transparent resin, is further disposed on the first display panel 201 and the second display panel 202.

Optionally, the transparent protective layer 300 covering the first display panel 201 and the transparent protective layer 300 covering the second display panel 202 can be integrally formed.

For example, a third display panel 203 can be disposed on the second bottom surface 103 of the backlight module 100 to achieve the function of secondary screen display of the display device 200.

Optionally, at least one of the first display panel 201, the second display panel 202 and the third display panel 203 is a touch display panel so as to realize the touch function of the display device 200.

To allow multi-surface display, a backlight source can be individually designed for each of the display panel; for example, the first display panel 201 corresponds to a first backlight source, and the second display panel 202 corresponds to a second backlight source. A first backlight source unit and a second backlight source unit can each include a backlight source, a reflector sheet, a light guide plate, an optical film unit and the like, to allow providing the first display panel 201 and the second display panel 202 with a back light, respectively.

Embodiments of the present disclosure provide a light guide plate, a backlight module and a display device. The light guide plate includes a first recess disposed on a first bottom surface of the light guide plate, the first recess being configured to dispose a first optical film unit; and a second recess disposed on a side surface of the light guide plate, the second recess being configured to dispose a second optical film unit. In this way, the backlight module including the light guide plate can provide a first display panel disposed on the first bottom surface and a second display panel disposed on the side surface with light guiding at the same time, achieving the function of multi-surface display of the first display panel and the second display panel through the backlight module, which increases the display area of the display device.

In the representation of the present description, particular features, structures, materials or characteristics can be combined in any appropriate manner in any one or more embodiments or examples.

The described above are only exemplary embodiments for explaining the present disclosure, and the present disclosure is not intended to be limited thereto. For one of ordinary skill in the art, various modifications and improvements may be readily contemplated and made without departing from the spirit and scope of embodiments of the present disclosure, and all of which should fall within the protection scope of the present disclosure.

The present application claims priority of Chinese Patent Application No. 201510587544.7 filed on Sep. 15, 2015 and entitled "A LIGHT GUIDE PLATE, A BACKLIGHT MODULE AND A DISPLAY DEVICE", the disclosure of which is incorporated herein by reference in its entirety as part of the present application.

What is claimed is:

1. A display device, comprising a backlight module, wherein the backlight module comprises a light source, a first optical film unit, a second optical film unit and a light guide plate, the light source being configured to emit light to the first optical film unit, the second optical, film unit and the light guide plate; wherein the light guide plate comprises: a first bottom surface and a second bottom surface disposed in opposite, and two side surfaces, wherein the first bottom surface is provided with a first recess, the first optical film unit being disposed within the first recess; each side surface is provided with a second recess, the second optical film unit being disposed within the second recess; and the second bottom surface is provided with a third recess, the third recess being configured to dispose a third optical film unit, wherein the second recesses are respectively provided on the two side surfaces of the light guide plate perpendicular to the first bottom surface and the second bottom surface where the first recess and the third recess opposite and respectively located; and wherein the first bottom surface of the backlight module is provided with a first display panel, at least one of the two side surfaces of the backlight module is provided with a second display panel and a second bottom surface of the backlight module is provided with a third display panel.

2. The display device of claim 1, further comprising a reflector sheet and a third optical film unit, wherein,
the second bottom surface is provided with a third recess, and the reflector sheet and the third optical film unit attached with the reflector sheet are disposed within the third recess.

3. The display device of claim 2, further comprising a light shielding sheet,
the light shielding sheet is disposed outside the first recess of the first bottom surface, and the first optical film unit is covered with a portion of the light shielding sheet.

4. The display device of claim 2, further comprising a light shielding sheet,
the light shielding sheet is disposed outside the second recess of the side surface, and the second optical film unit is covered with a portion of the light shielding sheet.

5. The display device of claim 2, further comprising a light shielding sheet,
the light shielding sheet is disposed outside the third recess of the second bottom surface, and the third optical film unit is covered with a portion of the light shielding sheet.

6. The display device of claim 1, wherein the first display panel and the second display panel are two portions formed from a single flexible display panel upon being bent.

7. The display device of claim 6, wherein at least one of the first display panel and the second display panel is a touch display panel.

8. The display device of claim 1, wherein at least one of the first display panel, the second display panel and the third display panel is a touch display panel.

9. The display device of claim 1, further comprising a transparent protective layer covering the first display panel and the second display panel.

10. The display device of claim 1, wherein at least one of the first display panel and the second display panel is a touch display panel.

* * * * *